United States Patent
Pi (10) Patent No.: US 6,427,332 B1
(45) Date of Patent: Aug. 6, 2002

(54) CLIP TYPE KITCHEN PEELING TOOL (76) Inventor: Ching-Tien Pi, 7Fl., No. 19, Alley 1, Lane 269, Wu Shing St., Taipei (TW)

( * ) Notice: Subject to any disclaimer, the term of this patent is extended or adjusted under 35 U.S.C. 154(b) by 0 days.

(21) Appl. No.: 09/619,622

(22) Filed: Jul. 19, 2000

(51) Int. Cl.[7] ................................................. A23N 7/00
(52) U.S. Cl. ...................... 30/123.6; 30/123.7; 99/593; 99/594
(58) Field of Search ............................. 30/123.6, 279.6, 30/123.5, 123.7, 300, 136, 142, 113.1, 113.2, 113.3; D07/693; 99/593, 594, 596, 598, 599

(56) References Cited

U.S. PATENT DOCUMENTS

| | | | | |
|---|---|---|---|---|
| 551,246 A | * | 12/1895 | Zeitfuchs | 99/593 |
| 1,357,377 A | * | 11/1920 | Brand | 99/593 |
| 3,009,245 A | * | 11/1961 | Senkewitz | 30/279.6 |
| 3,116,770 A | * | 1/1964 | Tanuma | 30/123.5 |
| 5,237,749 A | * | 8/1993 | Henning et al. | 30/123.6 |
| 5,305,527 A | * | 4/1994 | Holcomb | 30/123.5 |
| 5,957,045 A | * | 9/1999 | He et al. | 99/541 |
| 6,082,253 A | * | 7/2000 | Ridler | 99/594 |

* cited by examiner

*Primary Examiner*—Kenneth E. Peterson
*Assistant Examiner*—Omar Flores-Sánchez
(74) *Attorney, Agent, or Firm*—Troxell Law Office PLLC (57) ABSTRACT

The kitchen peeling tool which includes a clip type controlling handle bar having an upper and a lower shanks pivoted to it, a blade holder, and an direction turning mechanism for fruits of various sizes to be inserted in. The upper shank is detachably coupled with the blade holder, while the lower shank is screw combined to the all direction turning mechanism turnable in all directions thereby peeling the fruit smoothly and finely with the blade closely touching on the surface of the fruit.

20 Claims, 8 Drawing Sheets

CLIP TYPE KITCHEN PEELING TOOL

BACKGROUND OF THE INVENTION

(1) Field of the Invention

The present invention relates to a clip type kitchen-peeling tool, and more particularly, to a kitchen peeler which can clip the object stably so as to facilitate peeling operation.

(2) Description of the Prior Art

As it is well known, the outer surface of a spherical fruit is usually formed into an arcuate shape, while human hand is accustomed to operating a peeler in straight direction at the time of peeling a fruit. This often causes inconvenience in peeling a fruit with the result that the fruit is peeled either too deep or incomplete. Peeling effect depends very much on skill of using the peeler. Other undesired results often accompany with using a conventional peeler, for example, hurting the user's fingers, contaminating the fruit or even dropping the whole fruit on the ground.

SUMMARY OF THE INVENTION

Aiming at the above-depicted defects, the present invention is to propose a newly developed construction of a clip type kitchen-peeling tool capable of performing a perfect peeling work even used by a most awkward user.

Accordingly, it is an object of the present invention to provide a clip type kitchen peeling tool which can stably clip a fruit so that the peeling work can be carried out smoothly from the upper part to the lower part of the fruit with a delicate motion just like a divider scribing an arc track by controlling a peeler blade closely in touch with the fruit surface.

It is another object of the present invention to provide a clip type kitchen tool by that only top central depressed part of the fruit is pressed by the user's thumb so as to keep the peeled fruit clean and wholesome.

It is still another object of the present invention to provide a clip type kitchen tool which is applicable to all differently sized fruit.

To achieve these and other objects mentioned above, the peeling tool of the present invention includes a clip type controlling handle bar having an upper shank and a lower shank pivoted to it; a blade holder; and an all direction turning mechanism for firsts of various sizes to be inserted in. The end portion of the upper shank is detachably coupled with the blade holder, while the end portion of the lower shank is screw combined to the all direction turning mechanism, which as it is called, is turnable in all directions so as to peel the fruit smoothly and finely with the blade closely touching on the surface of the fruit.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

Figure 1:
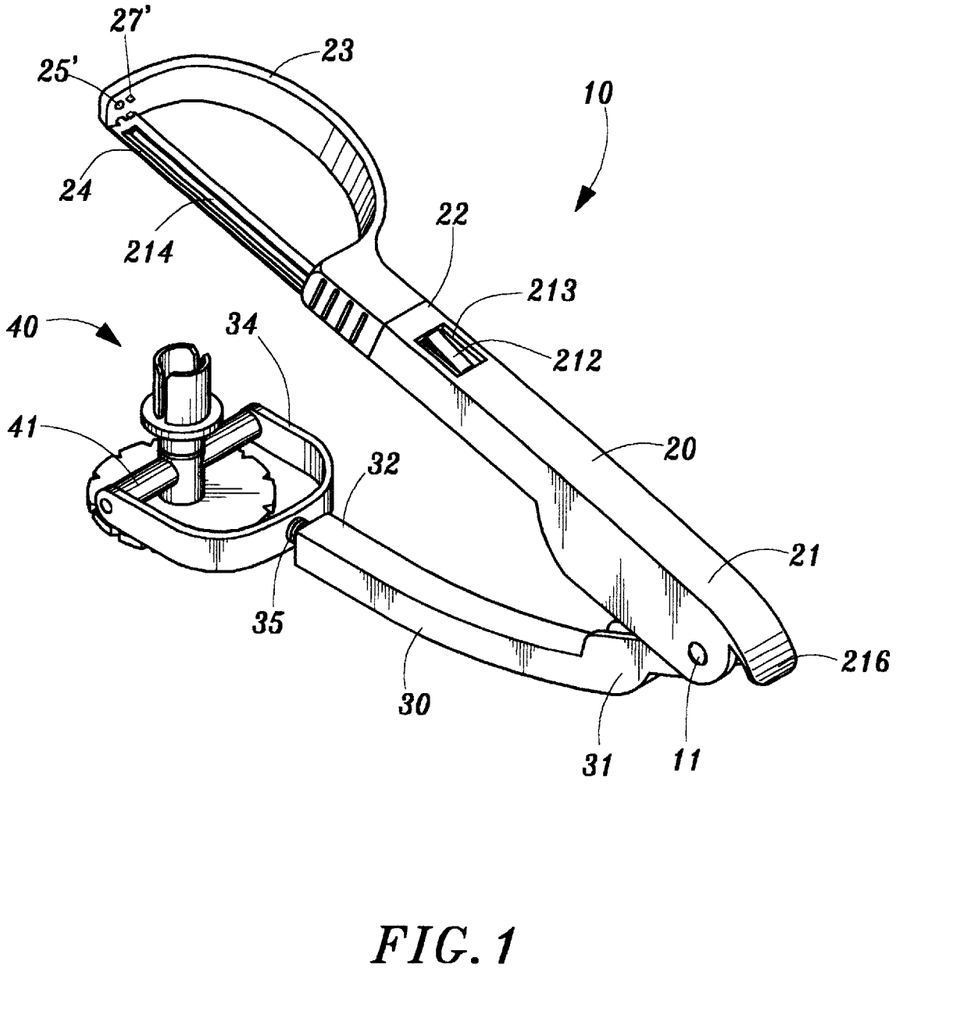
FIG. 1 is a three dimensional view of the preset invention.
Figure 2:
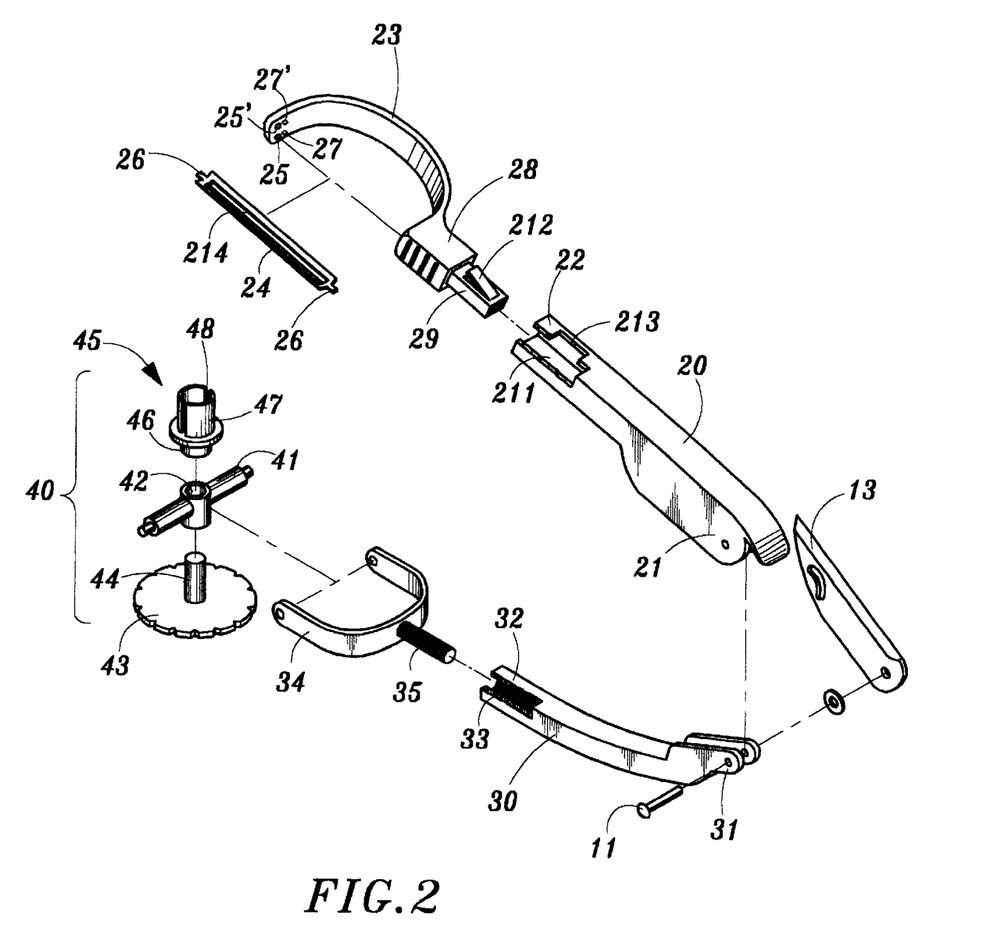
FIG. 2 is a three dimensional exploded view of the present invention.
Figure 3:
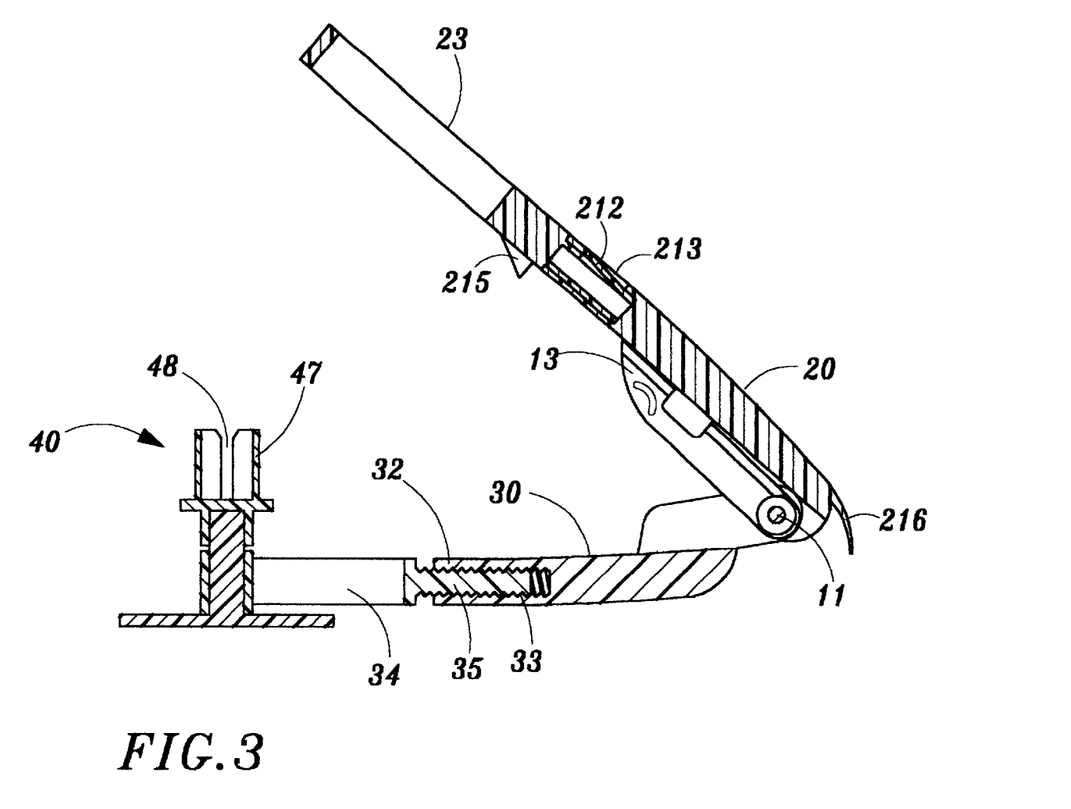
FIG. 3 is a cross sectional view of the present invention.

Referring to FIGS. 1, 2 and 3, the clip type peeling tool of the present invention includes a clip type controlling handle bar 10 having an upper shank 20 and a lower shank 30 attached to it with a pivot 11 piercing through respective first ends 21, 31 of the upper shank 20 and lower shank 30 such that the two shanks 20 and 30 can move approaching to and apart from each other with respect to the pivot 11 as a fulcrum; and a ] shaped blade folder 23 with a blade 24 installed therein is detachably coupled with a second end 22 of the upper shank 20. A pair of insertion holes 25 is formed at both ends of the inner wall surface of the blade holder 23 so as to accept a pair of protuberances 26 each formed at respective end of the blade 24 for supporting the blade 24. Adjacent to the insertion hole 25 at the distal end there is provided a stopper 27 which is useful for preventing the blade 24 from turning over 180 degrees that will cause the blade 24 to face its backside to the fruit so that being unable to carry on peeling work.

Figure 4:
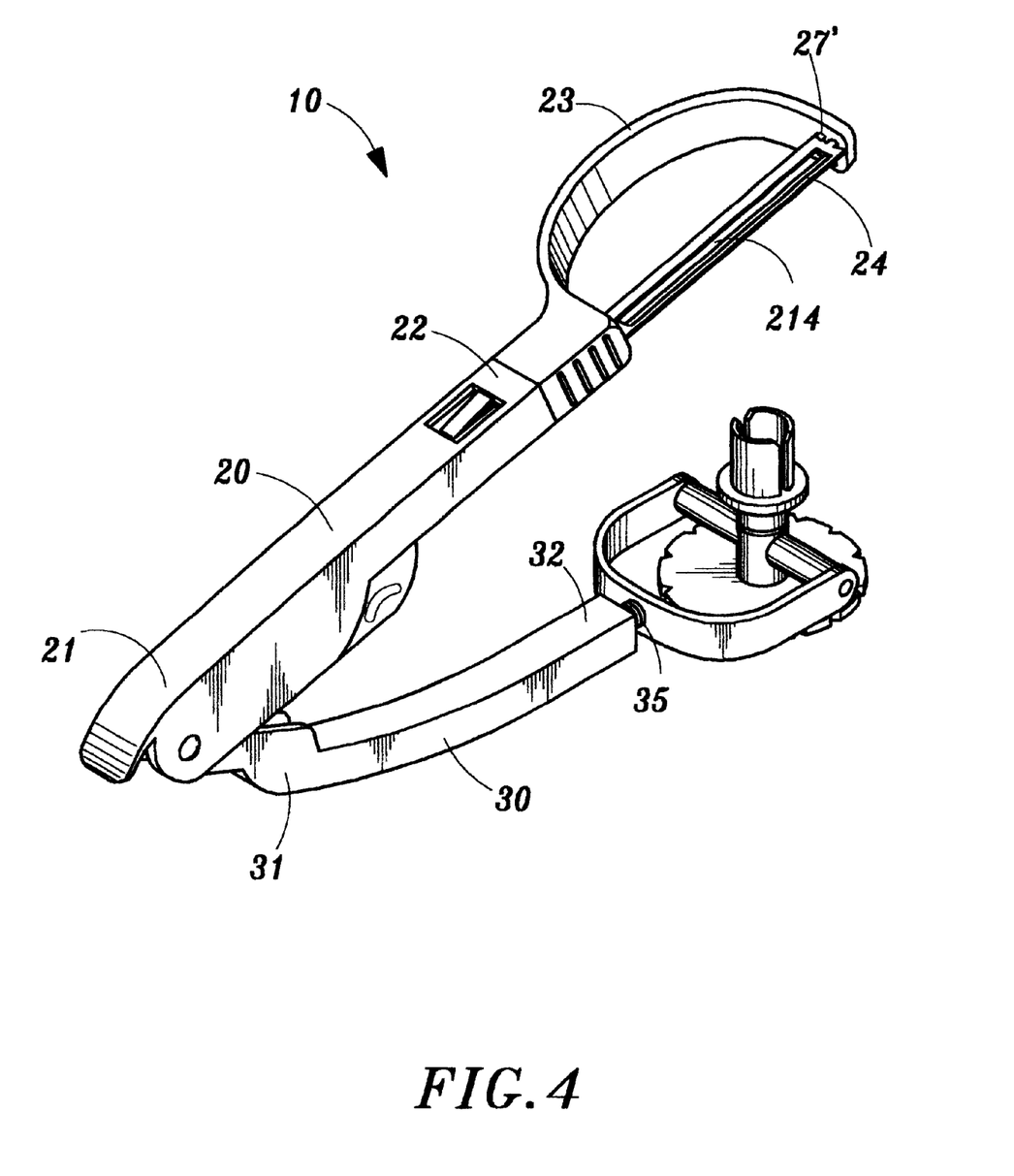
FIG. 4 is a three dimensional view showing another aspect of the present invention for a left handed user.

The terminal of the blade holder 23 is formed into a joint section 28 which stretches out a joint tongue 29 to be inserted into an open slot 211 of the upper shank 20. An outwardly protruded spring leaf 212 is provided on the joint tongue 29 for detaining a junction window 213 near the second end 22 such that the blade holder 23 is not to be disconnected accidentally from the upper shank 20. The above-described installation is for normally right-hander users. However, for the left handed users, the blade 24 shall be installed in the blade holder 23 with the pair of protuberances 26 fitted into the corresponding adjacent insertion holes 25' instead of 25. Assembly of rest of the parts is similar to that for right-handed users. At this time the roll of preventing the blade 24 from turning over 180 degrees is played by a stopper 27' provided near the stopper 27 as show in FIG.4.

The second end 32 of the lower shank 30 is provided with a threaded hole 33 which can be screw combined with a screw rod 35 of a supporting framework 34 of fruits so as to adjust the length of the lower shank 30 according to sizes of fruits. There is an all direction turning mechanism 40 mounted in the supporting framework 34 with a sustaining arm 41 rotatably supported by holes at both sides of the supporting framework 34. A let through hole 42 is bored transversely through the center of the sustaining arm 41 for inserting an axle 44 of a turning disk 43 therein. On the other hand, a juncture 46 of a fruit fixing post 45 is fitted to the top end of the axle 44 and is fixed thereat. A fruit insertion stub 47 is provided on top of the juncture 46 for inserting a fruit from its bottom and fixing it thereat. Consequently, with this structure, the fruit insertion stub 47 turns together with the fruit fixed thereon when being driven by the turning disk 43.

The serrated design of circular periphery of the turning disk 43 facilitates turning it with a users finger and prevents slipping of the users finger when it is exerting rotating force to the disk 43. The fruit insertion stub 47 is a hollow tube body with a longitudinal fissure 48 formed thereof which is helpful for excluding air and cleaning the culls remaining in the stub 47.

Figure 5:
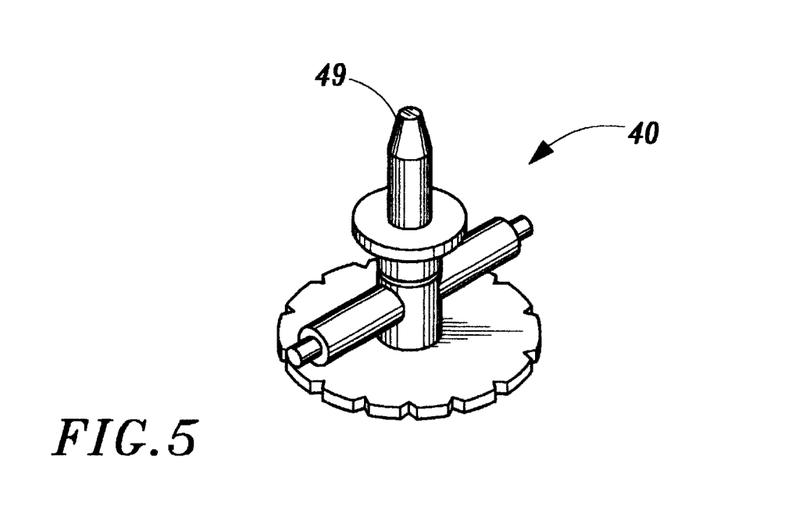
FIG. 5 is a three-dimensional view showing a modified configuration of the fruit insertion stub in a second embodiment of the present invention.

Referring to FIG. 5, a three dimensional view showing a modified configuration of the fruit insertion stub in a second embodiment, in this aspect, a fruit insertion stub 49 is made into a rod figure for facilitating piercing a fruit from its bottom and fixing it.

Figure 6A:
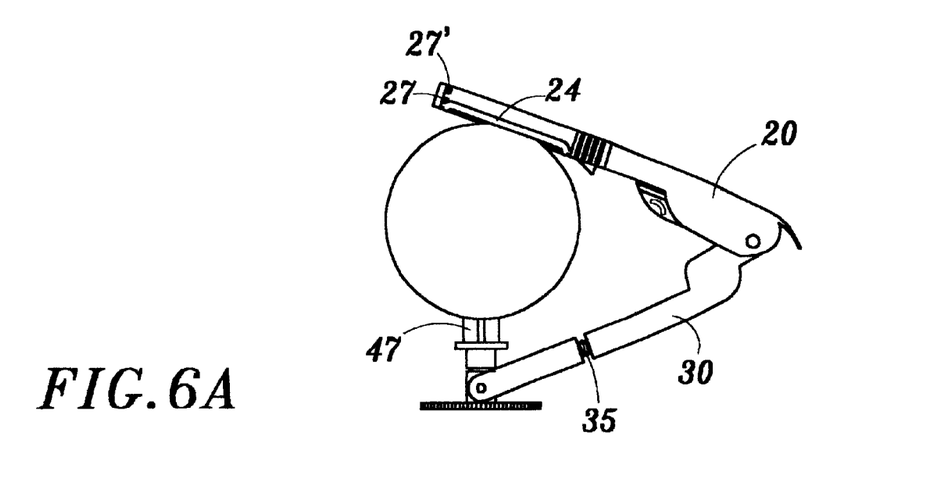
FIGS. 6A, 6B and 6C are three views showing how the peeling tool of the present invention holds the first of different sizes.
Figure 6B:
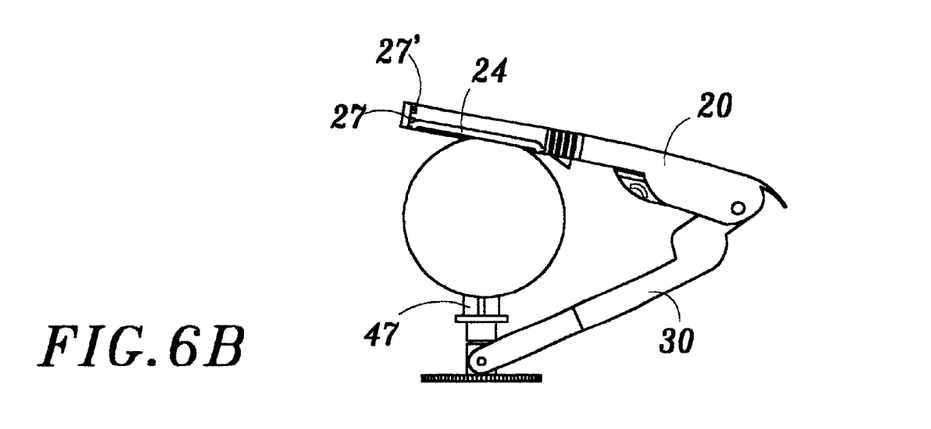
Figure 6C:
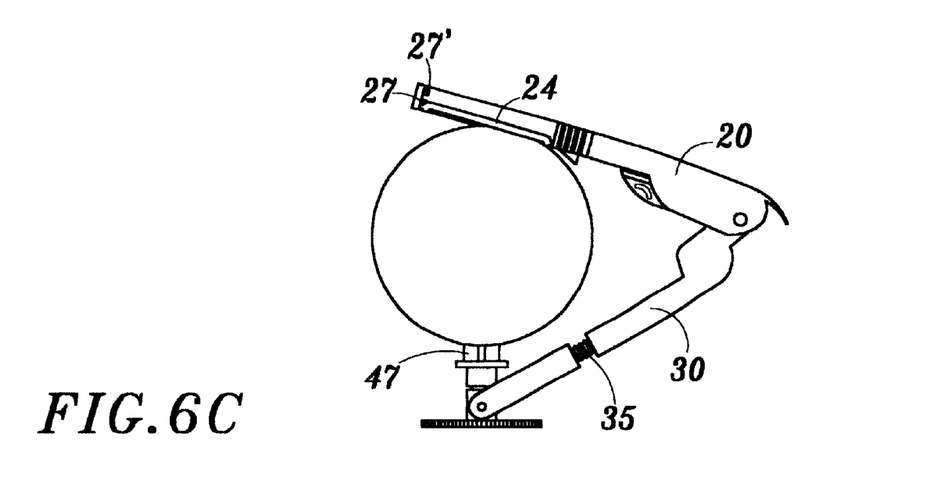

Referring to FIGS. 6A, 6B and 6C, in order to align the blade 24 flush against the curved surface of different sized spherical fruits and peel them precisely along a arcuate track, the length of the lower shank 30 may be adjusted according to sizes of the fruits thereby aligning the fruit insertion stub 47 to the blade 24 in a right direction, In FIG. 6A, a normal sized fruit is clipped, while in FIG. 6B, a smaller sized fruit is clipped, and in FIG. 6C, a larger sized fruit is clipped. From the above three drawings, it is clear that when peeling a smaller fruit, the lower shank 30 should be adjusted shorter by rotating the screw rod 35 in clockwise direction, on the contrary, When peeling a larger fruit, the lower shank 30 should be adjusted longer by rotating the screw rod 35 in counter clockwise direction.

Figure 7:
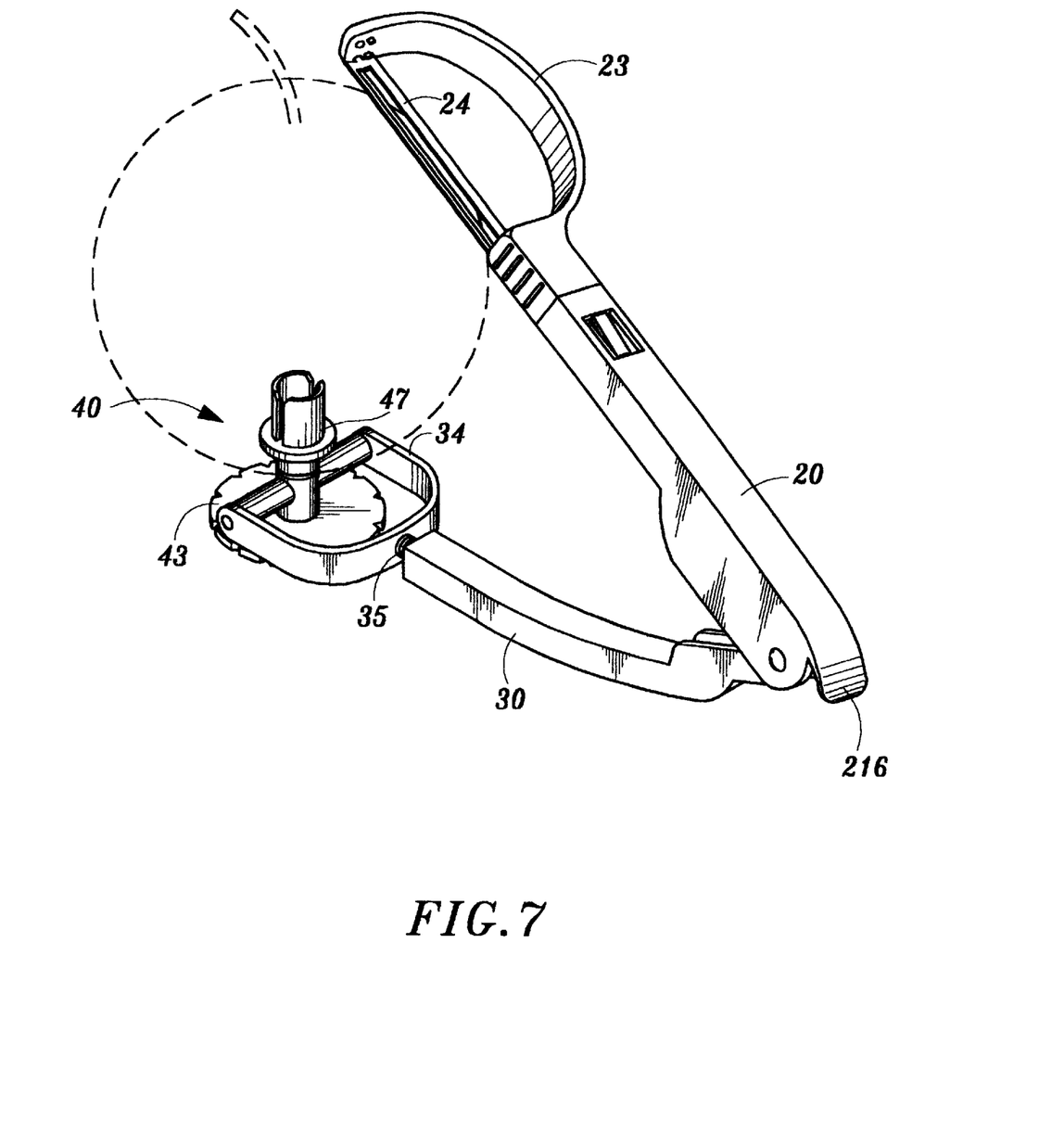
FIG. 7 is a schematic view showing state of the peeling tool of the present invention being on operation.

Referring to FIG. 7, where the peeling tool of the present invention is in operation, at first, adjusting the length of the lower shank 30 according to size of the fruit, then inserting the fruit into the fruit insertion stub 47 from the bottom center of the fruit. Next, supporting the bottom of the turning disk 43 with users middle and ring fingers, while pressing the top center portion of the fruit with user's thumb so as to hold the fruit in the air. Next, pressing down the upper shank 20 with user's other hand and make the blade 24 closely in touch with the fruit surface. Then, pressing the blade 24 to remove downward by turning the disk 43 outward, and the blade 24 can cut automatically into the fruit and begin to peel it with a certain depth. As the angle of elevation of the blade 24 can vary widely, the blade 24 is always closely in touch with the fruit surface during the whole peeling procedure.

Turning the fruit together with the turning disk 43 peels the entire skin of the fruit inserted on the fruit insertion stub 47 successively from place to place. During the whole peeling procedure, only the thumb is used to touch pressing the fruit on the top center portion of the fruit but rest portions of the fruit are remain untouched thereby keeping the peeled fruit perfectly wholesome.

Figure 8:
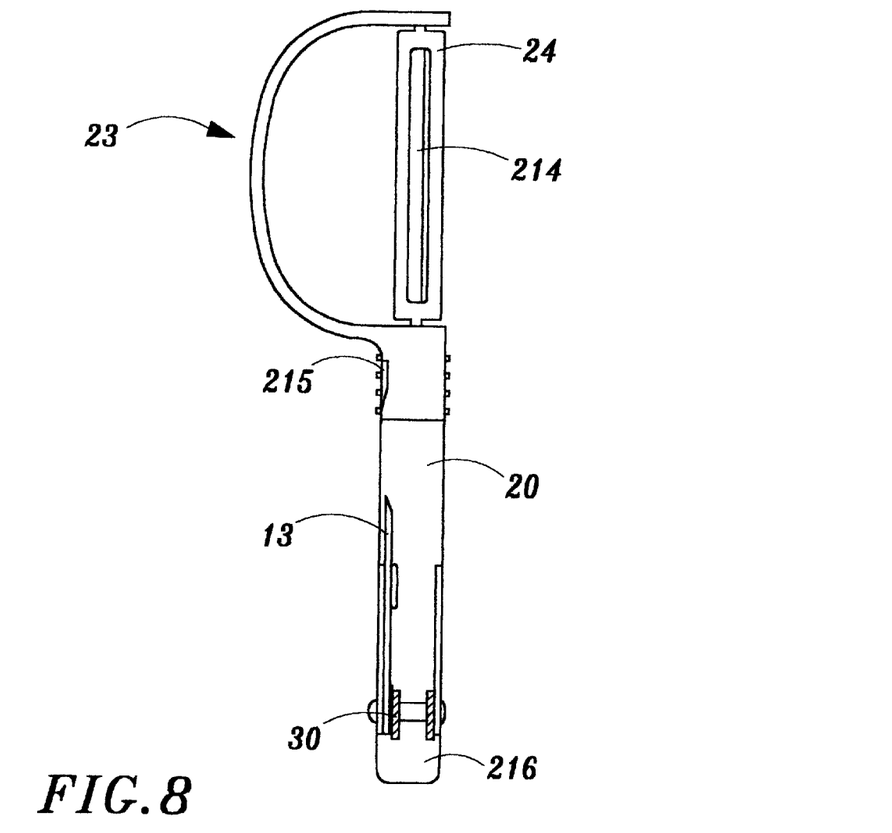
FIG. 8 is a plan view showing how a blade is installed in the blade holder.

As shown in FIGS. 2 and 8, a foldable small knife 13 is attached to the pivot 11 for scooping and cutting the fruit in case of need.

Figure 9:
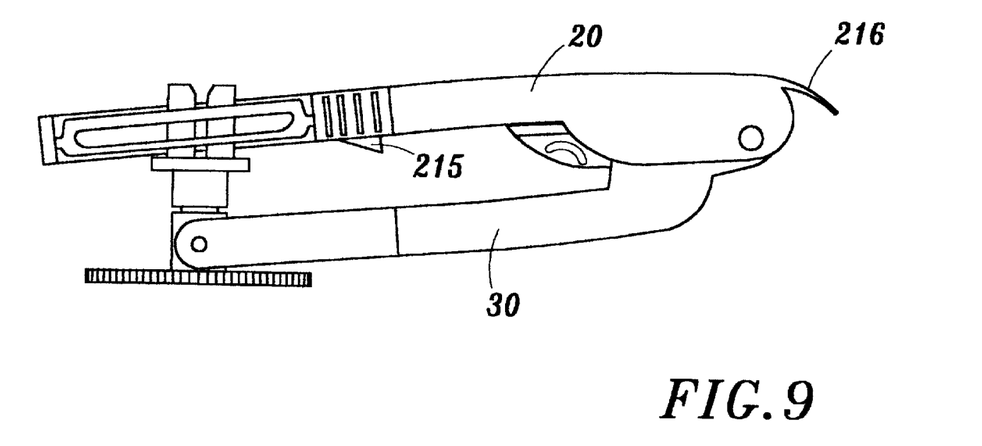
FIG. 9 is a view showing the peeling tool of the present invention in folded state.

Referring to FIGS. 8 and 9, a row of pointed tooth 215 is formed along inner side surface of the joint section 28 of the blade holder 23 for tearing the thick skin of an orange, or a grape-fruit etc. the terminal of the first end 21 of the upper shank 20 is formed into a thin spoon 216 for excoriating the thick skin of an orange, a grape-fruit etc. as shown in FIG. 9, the upper and the lower shanks 20 land 30 are folded inwardly to become a compact, small sized conveniently portable peeling tool when it is not is use.

Figure 10:
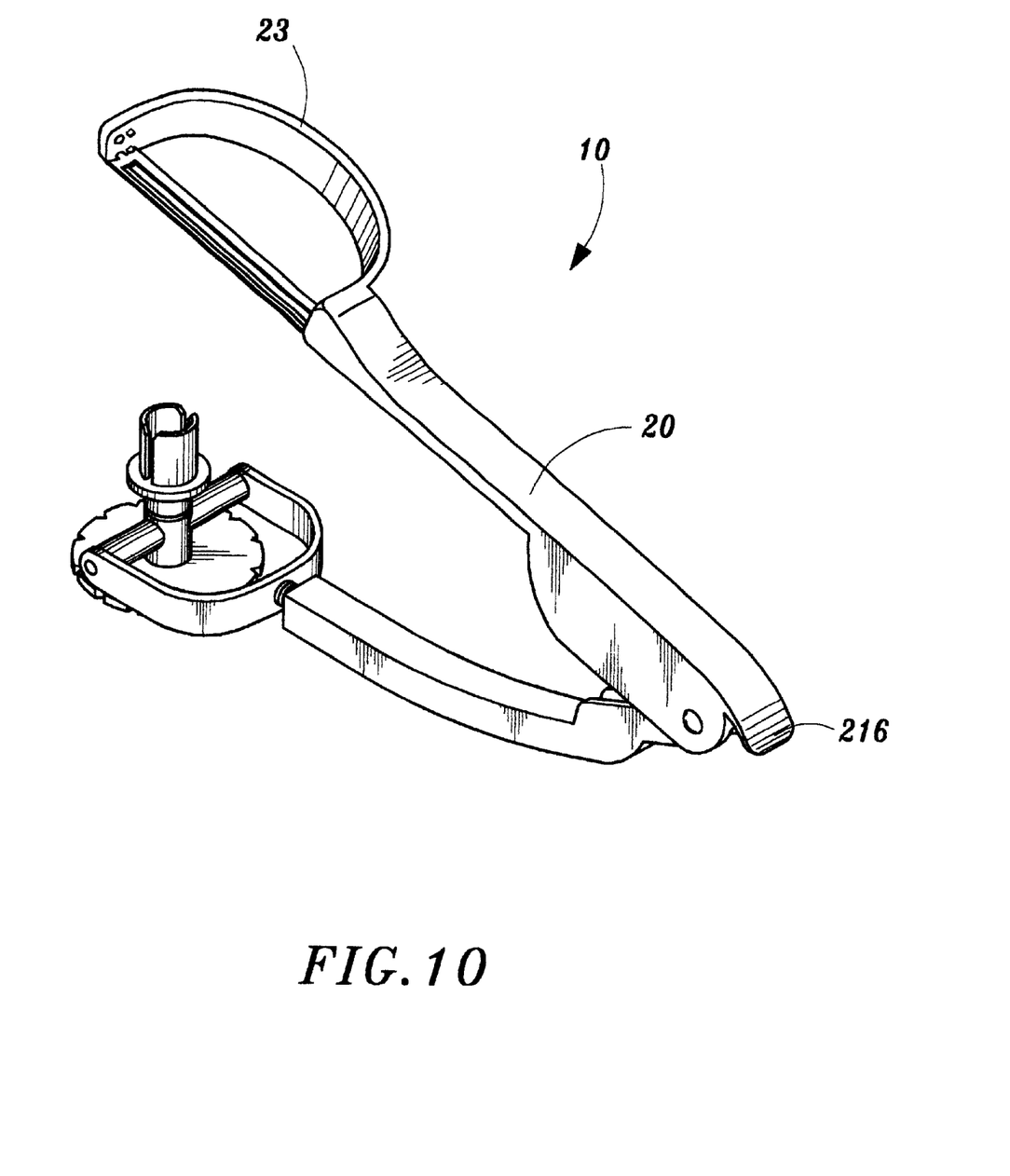
FIG. 10 is a schematic view showing one piece fabricated blade folder and upper shank in a third embodiment of the present invention.

Referring FIG. 10, the blade holder 23 and upper shank 20 can be fabricated in one piece.

Although the present invention has been described in terms of the presently preferred embodiments, it is to be understood that such disclosure is not to be interpreted as limiting. Various alternations and modifications will be doubt become apparent to those skilled in the art after reading the above disclosure. Accordingly, it is intended that the appended claims be interpreted as covering all alternations and modifications as fall within the true spirit and scope of the invention.

What is claimed is:

1. A clip type kitchen peeling tool comprising:
    a clip type controlling handle bar having an upper shank and a lower shank pivotally attached together at a pivot such that said two shanks are movable relative to each other, a length of the lower shank being adjustable;
    a blade holder with a variable angle blade installed therein, the blade holder being detachably coupled with said upper shank;
    a supporting framework mounted on said lower shank, said supporting framework including a screw rod engaging a threaded hole in said lower shank; and,
    an all direction turning mechanism mounted in said supporting framework being turnable at any angle, said all direction turning mechanism including a fruit insertion stub for inserting and supporting a fruit.

2. The peeling tool as claimed in claim 1, wherein said blade holder is detachably coupled to said upper shank in a junction window at an upper portion thereof, said blade holder including a spring leaf at a joint section with said upper shank.

3. The peeling tool as claimed in claim 1, wherein at least one stopper is formed on inner surface of said blade holder so as to prevent said blade from turning more than 180 degrees.

4. The peeling tool as claimed in claim 1, further comprising a row of pointed teeth formed along an inner side surface of the blade holder for tearing skin of fruit.

5. The peeling tool as claimed in claim 1, wherein a first end of said upper shank is formed into a spoon for excoriating skin of fruit.

6. The peeling tool as claimed in claim 1, wherein said blade holder and said upper shank are fabricated on one piece.

7. A clip type kitchen peeling tool comprising:
    a clip type controlling handle bar having an upper shank and a lower shank pivotally attached together at a pivot such that said two shanks are movable relative to each other;
    a blade holder with a variable angle blade installed therein, the blade holder being detachably coupled with said upper shank;
    a supporting framework mounted on said lower shank; and,
    an all direction turning mechanism mounted in said supporting framework being turnable at any angle, said all direction turning mechanism including a fruit insertion stub for inserting and supporting a fruit, said all direction turning mechanism further including a sustaining arm rotatably supported by said supporting framework, a through hole extending transversely through a center of said sustaining arm, an axle of a turning disk inserted therein, and a fruit fixing post fixed to a top end of the axle.

8. The peeling tool as claimed in claim 7, wherein said blade holder is detachably coupled to said upper shank in a junction window at an upper portion thereof, said blade holder including a spring leaf at a joint section with said upper shank.

9. The peeling tool as claimed in claim 7, wherein at least one stopper is formed on inner surface of said blade holder so as to prevent said blade from turning more than 180 degrees.

10. The peeling tool as claimed in claim 7, further comprising a row of pointed teeth formed along an inner side surface of the blade holder for tearing skin of fruit.

11. The peeling tool as claimed in claim 7, wherein a first end of said upper shank is formed into a spoon for excoriating skin of fruit.

12. The peeling tool as claimed in claim 7 wherein said blade holder and said upper shank are fabricated in one piece.

13. The peeling tool as claimed in claim 7, wherein said fruit insertion stub comprises a hollow tube body with a longitudinal fissure formed therein.

14. The peeling tool as claimed in claim 7, wherein said fruit insertion stub comprises a rod.

15. A clip type kitchen peeling tool comprising:
- a clip type controlling handle bar having an upper shank and a lower shank pivotally attached together at a pivot such that said two shanks are movable relative to each other;
- a blade holder with a variable angle blade installed therein, the blade holder being detachably coupled with said upper shank;
- a supporting framework mounted on said lower shank;
- an all direction turning mechanism mounted in said supporting framework being turnable at any angle, said all direction turning mechanism including a fruit insertion stub for inserting and supporting a fruit; and,
- a knife attached to said pivot for scooping and cutting fruit.

16. The peeling tool as claimed in claim 15, wherein said blade holder is detachably coupled to said upper shank in a junction window at an upper portion thereof, said blade holder including a spring leaf at a joint section with said upper shank.

17. The peeling tool as claimed in claim 15, wherein at least one stopper is formed on inner surface of said blade holder so as to prevent said blade from turning more than 180 degrees.

18. The peeling tool as claimed in claim 15, further comprising a row of pointed teeth formed along an inner side surface of the blade holder for tearing skin of fruit.

19. The peeling tool as claimed in claim 15, wherein a first end of said upper shank is formed into a spoon for excoriating skin of fruit.

20. The peeling tool as claimed in claim 15, wherein said blade holder and said upper shank are fabricated on one piece.

* * * * *